US008102094B2

(12) United States Patent
Muehlhausen et al.

(10) Patent No.: US 8,102,094 B2
(45) Date of Patent: Jan. 24, 2012

(54) DEVICE FOR CONNECTING AN ELECTRIC MOTOR INTENDED FOR USE IN A FUEL TANK, IN PARTICULAR OF A MOTOR VEHICLE

(75) Inventors: Ralf Muehlhausen, Rotenburg (DE); Wolfgang Warnke, Herleshausen (DE)

(73) Assignee: Continental Automotive GmbH, München (DE)

( * ) Notice: Subject to any disclaimer, the term of this patent is extended or adjusted under 35 U.S.C. 154(b) by 151 days.

(21) Appl. No.: 12/309,458

(22) PCT Filed: Jul. 16, 2007

(86) PCT No.: PCT/EP2007/057307

§ 371 (c)(1),
(2), (4) Date: Feb. 19, 2009

(87) PCT Pub. No.: WO2008/009653

PCT Pub. Date: Jan. 24, 2008

(65) Prior Publication Data

US 2009/0289510 A1 Nov. 26, 2009

(30) Foreign Application Priority Data

Jul. 18, 2006 (DE) ........................ 10 2006 033 231

(51) Int. Cl.
*H02K 13/00* (2006.01)

(52) U.S. Cl. ........................................................ 310/249

(58) Field of Classification Search .................... 310/71, 310/249, 248
See application file for complete search history.

(56) References Cited

U.S. PATENT DOCUMENTS

| | | | | |
|---|---|---|---|---|
| 3,148,295 | A | 9/1964 | Hulburt | |
| 4,350,909 | A | 9/1982 | Yamada | |
| 5,488,261 | A * | 1/1996 | Swoboda et al. | 310/249 |
| 6,242,838 | B1 * | 6/2001 | Kiyose et al. | 310/233 |
| 6,413,462 | B1 | 7/2002 | Zoell et al. | |
| 6,478,613 | B1 | 11/2002 | Zoell et al. | |
| 6,482,522 | B1 | 11/2002 | Parsonage et al. | |

FOREIGN PATENT DOCUMENTS

| | | | |
|---|---|---|---|
| CN | 1304478 | A | 7/2001 |
| CN | 2584994 | Y | 11/2003 |
| DE | 199 21 540 | | 11/2000 |
| DE | 19921540 | A1 | 11/2000 |
| DE | 19954733 | A1 | 5/2001 |
| DE | 69817866 | T2 | 7/2004 |

* cited by examiner

*Primary Examiner* — Dang D Le
(74) *Attorney, Agent, or Firm* — Cozen O'Connor

(57) ABSTRACT

A device for connecting an electric motor intended for use in a fuel tank, in particular of a motor vehicle, with connection contacts carbon brushes sliding over an armature of a rotor, and electrical leads arranged between the connection contacts and the carbon brushes. The electrical leads have a sheath made of polytetrafluoroethylene.

14 Claims, 1 Drawing Sheet

DEVICE FOR CONNECTING AN ELECTRIC MOTOR INTENDED FOR USE IN A FUEL TANK, IN PARTICULAR OF A MOTOR VEHICLE

Device for connecting an electric motor intended for use in a fuel tank, in particular of a motor vehicle

CROSS REFERENCE TO RELATED APPLICATIONS

This is a U.S. national stage of application No. PCT/EP2007/057307, filed on 16 Jul 2007, which claims Priority to the German Application No.: 10 2006 033 231.8, filed: 18 Jul. 2006, the content of both being incorporated here by reference.

BACKGROUND OF THE INVENTION

1. Field of the Invention

The invention relates to a device for connecting an electric motor intended for use in a fuel tank, in particular of a motor vehicle, having connection contacts, carbon brushes that slide over an armature of a rotor, and electrical leads arranged between the connection contacts and the carbon brushes.

2. Description of the Prior Art

Devices of this kind are usually produced as a unit together with the carbon brushes and are known in practice. In this case, the electric motor used in the fuel tank serves to drive a fuel pump. In the device known from practice, connection contacts are mounted on a plastic part. The electric motor can be connected to a power supply system of the motor vehicle via the connection contacts. In addition, an interference-suppression part, which has one capacitor and two interference-suppression inductors is usually arranged in the plastic part. The plastic part is connected to the electric motor. The subregion of the lead which is routed out of the plastic part is designed as a flexible copper wire and routed as far as the respective carbon brush which is in contact with a collector of the electric motor. One disadvantage of the known device is that the electrical lead is corroded and subsequently destroyed in aggressive media, for example fuel.

DE 199 21 540 A1 discloses extrusion coating the region of the connecting point of an electrical lead to a contact element with a fuel-resistant plastic. The fuel-resistant plastics mentioned are POM and PPS. It has been found here that extrusion coating with POM or PPS leads to a high degree of rigidity of the electrical lead. Due to wear of the carbon brushes, they have to be adjusted in order to remain in contact with the collector. Permanent contact between the carbon brushes which are subject to wear and the collector is no longer ensured due to the high degree of rigidity of the electrical lead.

SUMMARY OF THE INVENTION

The invention is based on providing a device of the above-mentioned type which firstly is effectively protected against attacks by aggressive media and secondly ensures permanent contact between the carbon brushes and the collector of the electric motor.

According to one embodiment of the invention, the object is achieved in that the electrical leads have a sheath comprising polytetrafluoroethylene.

The very high degree of fuel resistance and the low tendency to swell of polytetrafluoroethylene (PTFE) allows a sheath of electrical leads to be designed with a low wall thickness. Due to the low wall thickness of the sheath, electrical leads of this type have a very high degree of flexibility. Consequently, the electrical lead is sufficiently mobile to follow adjustment movements of the carbon brushes as a result of wear. This therefore ensures that the carbon brushes are in permanent contact with the collector of the electric motor over the entire service life.

In an advantageous refinement, sheaths with a wall thickness of only 0.1 mm can be produced, as a result of which the electrical leads are provided with a particularly high degree of flexibility.

In a further advantageous refinement of the invention, in which the electrical component is arranged in a housing and the electrical leads are routed out of the housing, the sheath of the cable wire simultaneously serves as a seal between the electrical leads and the housing.

BRIEF DESCRIPTION OF THE DRAWINGS

The invention will be explained in greater detail using an exemplary embodiment. In the associated drawing FIG. 1 schematically depicts a longitudinal section through an electric motor having a device according to one embodiment of the invention.

DETAILED DESCRIPTION OF THE PRESENTLY PREFERRED EMBODIMENTS

Figure 1:
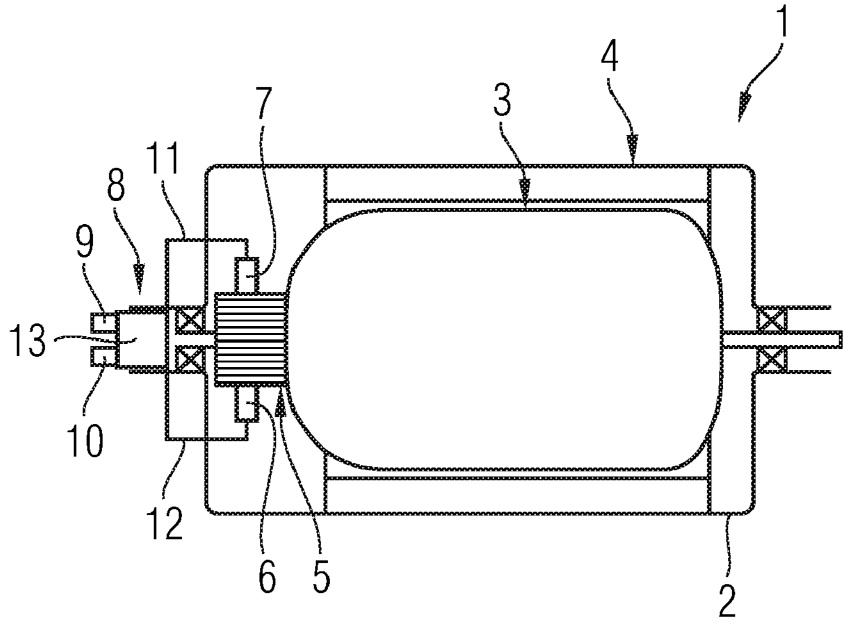

FIG. 1 shows an electric motor 1 having a rotor 3, which is rotatably mounted in a housing 2, and having a stator 4. In order to be supplied with electric power, the rotor 3 has an armature 5 over which carbon brushes 6, 7 slide. Electric power is supplied to the armature 5 via a device 8 having connection contacts 9, 10 and having electrical leads 11, 12 between which an interference-suppression part 13 is arranged. The electrical leads 11, 12 are coupled to the carbon brushes 6, 7. Plug-type contacts (not illustrated) of a power supply system can be connected to the connection contacts 9, 10. This electric motor 1 is intended to drive a fuel pump of a motor vehicle, and fuel flows through said fuel pump and around the electric motor.

Figure 2:
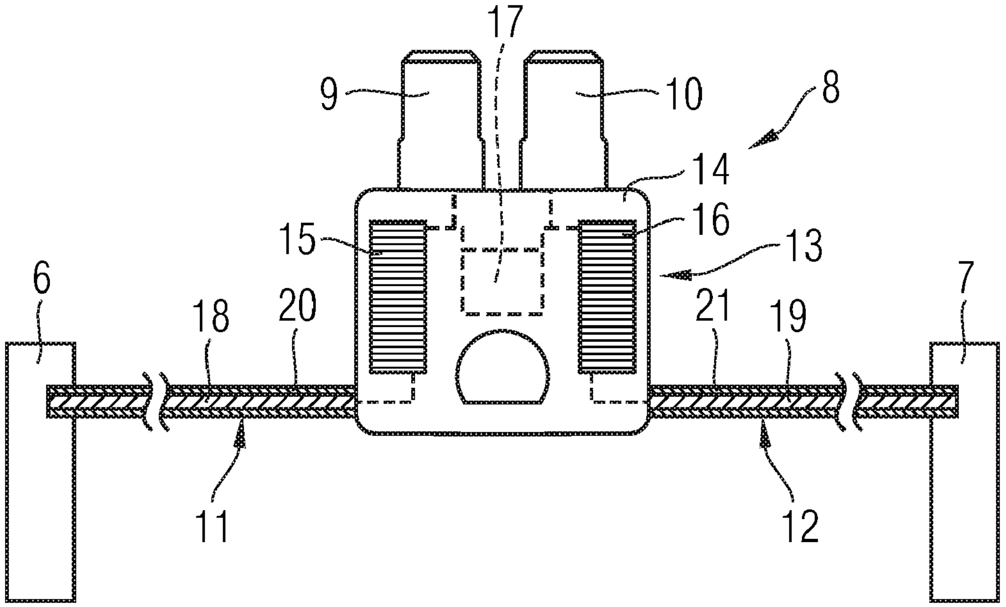
FIG. 2 is a greatly enlarged illustration of the device according to one embodiment of the invention.

FIG. 2 shows the device 8 from FIG. 1 on a greatly enlarged scale. The device 8 has a plastic part 14 for holding the connection contacts 9, 10 and in each case an inductor 15, 16 arranged between the connection contacts 9, 10 and electrical leads 11, 12. The connection contacts 9, 10 are jointly connected to a capacitor 17. The inductors 15, 16 and the capacitor 17 form the interference-suppression part 13. The electrical leads 11, 12 connect the electric motor 1 (illustrated in FIG. 1) to the poles of a power supply system. The two electrical leads 11, 12 comprise copper wires 18, 19 which are preferably extrusion coated with PTFE 20, 21. For the purposes of improved illustration, the electrical leads 11, 12 are illustrated on an enlarged scale. Despite being extrusion coated with PTFE 20, 21, the electrical leads are flexible so that they move at the same time as the carbon brushes 6, 7 wear away, and reliably ensure power is supplied to the electric motor 1 which is illustrated in FIG 1. 18, 19 which are extrusion coated with PTFE 20, 21. For the purposes of improved illustration, the electrical leads 11, 12 are illustrated on an enlarged scale. Despite being extrusion coated with PTFE 20, 21, the electrical leads are so flexible that they move at the same time as the carbon brushes 6, 7 wear away, and reliably ensure power is supplied to the electric motor 1 which is illustrated in FIG. 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for connecting an electric motor configured for use in a fuel tank, the electric motor comprising an armature of a rotor the device comprising:

at least one brush configured to slide over the armature of the rotor;

at least one connector contact; and an electric lead coupled between the at least one connector contact and the at least one brush, wherein the electric lead has a sheath comprising polytetrafluoroethylene with a wall thickness is less than or equal to about 0.1 mm.

2. The device according to claim 1, further comprising an inductor coupled between the electric lead and the connector contact.

3. The device according to claim 2, further comprises a capacitor having a first and a second contact, wherein the first contact is coupled to the at least one connector contact.

4. The device according to claim 1, wherein the sheath wall thickness is 0.1 mm.

5. A motor assembly comprising:

a housing;

a rotor rotatably mounted in the housing;

an armature coupled to the rotor configured to provide power to the rotor;

a plurality of brushes slideably coupled to the armature;

a plurality of electric leads, each of the plural leads having a first end electrically coupled to a respective one of the plural brushes;

a polytetrafluoroethylene sheath enveloping each of the plural leads ,said sheath having a respective wall thickness of less than or equal to about 0.1 mm; and an interference suppression part coupled to the plural leads.

6. The motor assembly of claim 5, wherein the interference suppression part comprises:

a plurality of inductors, a respective one of the plural inductor connected in series with each of the plural leads;

a plurality of contacts, each of the plural contacts connected to at least one of the plural inductors; and at least one capacitor connected between two of the plural contacts.

7. The motor assembly of claim 6, wherein the electrical lead is external to the housing.

8. The motor assembly of claim 7, wherein each of the plural sheaths forms a seal between the lead and the housing.

9. The motor assembly of claim 8, wherein each of the plural leads is a copper lead.

10. The motor assembly of claim 7, wherein the interference suppression part further comprises a body configured to retain the plural inductors, the plural contacts, and the at least one capacitor.

11. The motor assembly of claim 10, wherein the body of the interference suppression part is plastic.

12. The motor assembly according to claim 5, wherein each of the plural leads is the extrusion coated.

13. The motor assembly according to claim 12, wherein the extrusion coating is one of PTFE 20 and PTFE 21.

14. The device according to claim 5, wherein the sheath wall thickness is 0.1 mm.

* * * * *